*Sharrard, Bryan & Hunt.*
*Corn Harvester.*
N° 94446. Patented Aug. 31, 1869.
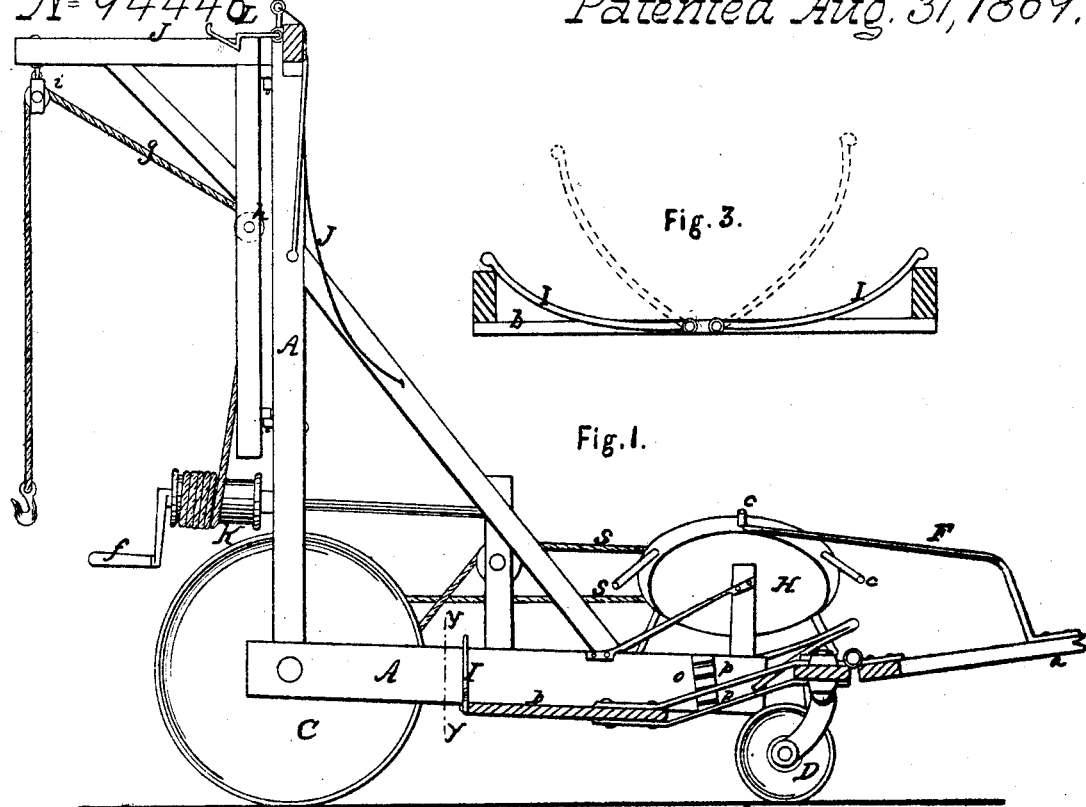
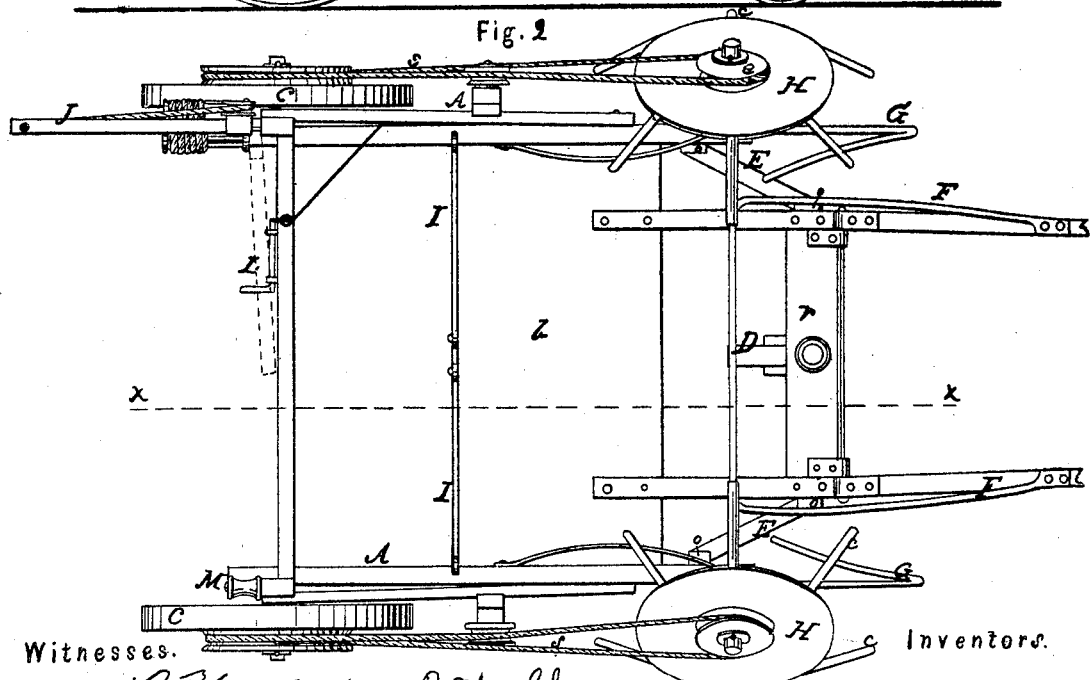
Witnesses.
L. Hailer
P. T. Dodge
Inventors.
J. H. Sharrard
Sam'l Bryan
Howard Hunt
by Dodge & Munn
Their Attorneys

United States Patent Office.

J. W. SHARRARD, SAMUEL BRYAN, AND HOWARD HUNT, OF JANESVILLE, WISCONSIN.

Letters Patent No. 94,446, dated August 31, 1869.

IMPROVED CORN-HARVESTER.

The Schedule referred to in these Letters Patent and making part of the same.

*To all whom it may concern:*

Be it known that we, J. W. SHARRARD, SAMUEL BRYAN, and HOWARD HUNT, of Janesville, in the county of Rock, and State of Wisconsin, have invented certain new and useful Improvements in Corn-Harvesting Machines; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention relates to corn-harvesting machines, and consists in a novel manner of constructing and arranging the various devices composing the same, all as hereinafter explained.

In the drawing—

Figure 1 is a longitudinal vertical section of our harvester, taken on the line $x\,x$ of fig. 2;

Figure 2 is a top plan view of our machine; and

Figure 3 is a cross-section, taken on the line $y\,y$ of fig. 1.

In building our harvester, we first construct a frame, A, of any requisite size, and of the form shown in the drawing.

The rear end of this frame we support on two large driving-wheels C, and its front end by a caster-wheel, D, which latter is located at the middle of the machine, immediately behind the thills $a$, as shown in figs. 1 and 2.

Diagonally from the front cross-bar $r$, to the outside rails of the frame, we locate knives or blades E, one on each side of the machine, as shown in figs. 1 and 2.

These blades E are secured in place by having their ends slipped into grooves $p$, in stationary blocks $o$, as shown in fig. 1.

Each of the blocks $o$ is provided with several of the grooves $p$, so that the knives may set higher or lower, as occasion requires.

To the side rails of the frame, above the knives, we attach the bent arms or guards G, having knife-edges, and which serve to direct the stalks against the forward ends of the knives E, and also aid in cutting them off.

On the rear end of the thills $a$, we locate a guard or fender, F, consisting of an iron rod, bent to the form shown in the drawings, and being for the purpose of directing the stalks into or against the arms of the reels, as hereinafter explained.

On each side of the frame, opposite the knives, we erect a post, and on each of these posts mount a reel, H, as shown in figs. 1 and 2.

These reels consist, each, of a circular head or disk, provided with a series of radial arms, $c$, which arms have an inclination of forty-five degrees downward from the edge of the disk, as shown in figs. 1 and 2.

The reels are secured on the post, so that the disk stands at an inclination of forty-five degrees toward the outside of the machine, and so that, as they are rotated, their arms, on approaching the inner or upper side, assume a horizontal position, but, on passing around to the lower outer side, assume a vertical position, as shown in figs. 1 and 2.

Each of the reels, we provide with a grooved pulley, connected, by a belt or chain, $s$, with a grooved pulley on the corresponding driving-wheel C, as shown in figs. 1 and 2.

Across the forward portion of the frame, we extend a platform, $b$, and to the rear edge of this platform, hinge or pivot two curved levers I, shown in figs. 1, 2, and 3.

To one side of the rear upright portion of the frame, we hinge a crane, J, which may be swung out, as shown in fig. 1, or closed up against the frame, as indicated by red lines in fig. 2.

On top of the frame, we locate a rocking catch, L, for fastening the crane shut, the catch being provided with a depending cord, J, for operating it by.

On one side of the upright portion of the frame, we mount a drum or windlass, K, and provide it with a crank or winch, $f$.

To the crane J, we attach a block, $i$, and a pulley, $h$, and pass a rope, $g$, over them, this rope $g$ being attached, at one end, to the drum K, and having its other end provided with a hook, as shown in fig. 1.

To the rear end of the frame, we attach a reel or spool, M, upon which the binding-cord or wire is wound.

In operating our harvester, it is drawn through the field, between two rows of standing corn, when the stalks, passing between the guards F and G, are seized by the reels, and, at the same instant, the knives E, riding against the stalks, cut them off in rapid succession.

The stalks, as they are cut off, fall back on to the platform $b$, across the levers I.

When a sufficient quantity of corn has accumulated on the platform, the levers I are thrown up, as shown by the red lines in fig. 3, compressing it into a compact bundle or shock. Wire or cord is then drawn from the reel M, and the shock bound, after which it is hooked on to rope $g$, elevated by the windlass, swung around to one side of the machine, and then dropped in a standing position.

By cutting the two central of six rows first, the whole six may be set in one shock-row, by means of the swinging crane.

Having thus fully described our invention,

What we claim as new, and desire to secure by Letters Patent, is—

1. The arrangement of the guard F, attached, at its front end, to the thills, in the manner shown and described.

2. The knife-holders o, provided with a series of slots, for adjusting the knives at different heights, substantially as described.

3. The spring-guards G, having their free arm provided with a knife-edge, and arranged at a reverse angle to the knives E, as set forth.

4. In combination with the frame A of a corn-stalk harvester, the crane J, when arranged substantially as shown and described.

5. The combination of the adjustable knives E, spring-guards G, stationary guards F, and inclined reels H, all constructed and arranged to operate substantially as described.

J. W. SHARRARD.
SAMUEL BRYAN.
HOWARD HUNT.

Witnesses:
PHILIP BURNS,
S. WITMER.